United States Patent
Samuel et al.

(10) Patent No.: US 9,458,334 B1
(45) Date of Patent: Oct. 4, 2016

(54) AQUEOUS RADIATION CURABLE INK COMPOSITION

(71) Applicant: Electronics for Imaging, Inc., Fremont, CA (US)

(72) Inventors: Joshua Samuel, Ann Arbor, MI (US); Yvonne D. Smith, Ypsilanti, MI (US)

(73) Assignee: Electronics for Imaging, Inc., Fremont, CA (US)

( * ) Notice: Subject to any disclaimer, the term of this patent is extended or adjusted under 35 U.S.C. 154(b) by 0 days.

(21) Appl. No.: 14/789,913

(22) Filed: Jul. 1, 2015

(51) Int. Cl.
| | |
|---|---|
| C08F 2/46 | (2006.01) |
| C08F 2/50 | (2006.01) |
| C08G 61/04 | (2006.01) |
| C09D 11/102 | (2014.01) |
| C09D 11/38 | (2014.01) |
| C09D 11/033 | (2014.01) |

(52) U.S. Cl.
CPC .......... *C09D 11/102* (2013.01); *C09D 11/033* (2013.01); *C09D 11/38* (2013.01)

(58) Field of Classification Search
CPC .... C09D 11/102; C09D 11/033; C09D 11/38
USPC ................. 522/64, 6, 1, 71, 189, 184; 520/1
See application file for complete search history.

(56) References Cited

U.S. PATENT DOCUMENTS

| | | | | |
|---|---|---|---|---|
| 2005/0250869 A1* | 11/2005 | Claes | ................... | C09D 11/101 522/71 |
| 2012/0328795 A1 | 12/2012 | Peeters et al. | | |
| 2015/0247044 A1* | 9/2015 | Brandstein | ........... | C09D 11/101 347/20 |

FOREIGN PATENT DOCUMENTS

| | | |
|---|---|---|
| EP | 2703459 A1 | 3/2014 |
| EP | 2757118 A1 | 7/2014 |
| WO | 02064689 A3 | 8/2002 |
| WO | 2009115489 A1 | 9/2009 |
| WO | 2010003924 A1 | 1/2010 |
| WO | 2011110495 A1 | 9/2011 |
| WO | 2012013488 A1 | 2/2012 |
| WO | 2012024130 A3 | 5/2012 |
| WO | 2013034880 A3 | 5/2013 |
| WO | 2014033656 * | 3/2014 |
| WO | 2014033656 A1 | 3/2014 |

* cited by examiner

*Primary Examiner* — Ling Choi
*Assistant Examiner* — Jessica E Whiteley
(74) *Attorney, Agent, or Firm* — Michael A. Glenn; Viola T. Kung; Perkins Coie LLP

(57) ABSTRACT

The present invention relates to an aqueous radiation curable ink composition. The ink composition comprises: (a) an aqueous dispersion comprising anionic acrylated polyurethane and non-volatile cations; (b) at least one non-ionic or anionic surfactant; (c) at least one humectant selected from the group consisting of: polyol, polyether, polyether alcohol, polyether polyols, urea, and amide; and (d) water. The ink composition does not contain a water-soluble or water-miscible (meth)acrylate monomer. The ink composition is redispersible in water after drying and before curing, and the ink composition is water-resistant after curing by electron beam or actinic radiation.

17 Claims, 1 Drawing Sheet

| | Ex 1 | Ex 2 | Ex 3 | Ex 4 (Comparative) | Ex 5 (Comparative) | Ex 6 (Comparative) |
|---|---|---|---|---|---|---|
| Dried films | 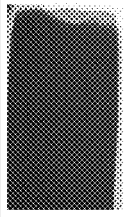 | 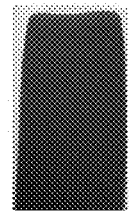 | 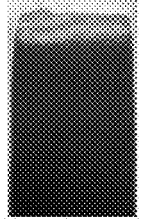 | 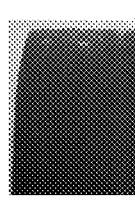 |  | 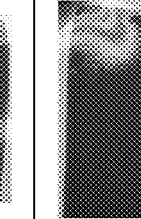 |
| Dried Films after Water Dip Test | 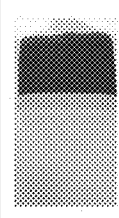 | 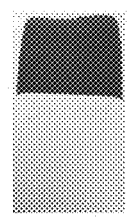 | 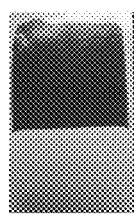 | 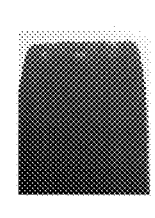 | 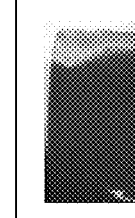 | 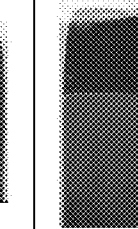 |

AQUEOUS RADIATION CURABLE INK COMPOSITION

FIELD OF THE INVENTION

The present invention relates to an aqueous radiation curable ink composition comprising anionic acrylated polyurethane and non-volatile cations. The ink composition is redispersible in water after drying and before curing, and the ink composition is water-resistant after curing by electron beam or actinic radiation.

BACKGROUND OF THE INVENTION

Currently there are a few common ways to print inkjet ink on to non-absorbent media, for example, solvent ink, 100% UV curable ink, and water based dispersion ink (e.g. latex). Solvent inks are relatively inexpensive but they have the drawback that the solvent needs to be evaporated, which poses an environmental risk both to the broader environment and to the workers engaged in printing. In addition, there is a fine balance so that the solvent is sufficiently fast evaporating to enable fast printing at low temperatures, while at the same time being slow enough so that print quality is not degraded by drying of the binder in the print-head or at the nozzles.

100% solid UV curable inks rely on chemistries that cure under actinic radiation. This effectively insures the curing of the ink on the substrate, for example by UV irradiation, while insuring that the ink does not cure in the print-head or at the nozzles. The 100% solid UV curable inks suffer from a few drawbacks. The material in the ink serves as a carrier for the pigment and hence the graphic information. Because these are materials synthesized to cure under light they are relatively costly compared to a simple solvent in a solvent based ink or compared to water in a water based ink.

In order to attain the low viscosities required for piezo print-heads, with some heads requiring a viscosity of 6-7 cP at jetting temperature, some formulated inks rely on small radiation curable monomers that polymerize to give a film. In order to achieve good chemical and physical resistance, these inks need to be highly cross-linked. High cross-linking leads to brittleness. Conversely the inks can be formulated to have a low degree of crosslinking and hence less brittle. In this case, the inks will be less chemically and physically resistant. To enable a low viscosity inkjet ink to cure at a sufficient rate required by today's printers, high levels of monomers and photoinitiators are required, which have the risk to migrate to surrounding environment and thus cause health and safety issues. The risk becomes particularly apparent for all printing that relates to the food, cosmetic or pharmaceutical industry.

Water based latex inks used today often use dispersions having high molecular weight polymers in water that enable a low viscosity fluid. The curing of these latex inks is thermal in nature, so that the mechanism that cures and forms a solid mechanically and chemically resistant film may also cause inadvertent cure of the inks in the nozzles of the print-head, leading to blocked or misdirected nozzles. In order to protect the print-head from inadvertent curing, it is advantageous to design the ink to cure at temperatures well above ambient temperature. These higher cure temperatures restrict the range of media that can be used with these inks.

BRIEF DESCRIPTION OF THE DRAWING

FIG. 1 shows pictures of the re-dispersibility of the ink compositions of Examples 1-6.

DETAILED DESCRIPTION OF THE INVENTION

The inventors have discovered an aqueous radiation curable ink composition that before being cured, is completely redispersible in water. After the ink is exposed to some form of actinic radiation or electron beam radiation, the ink reacts and cures so that it is water resistant and has some degree of solvent resistance. The present invention decouples the hardening (curing) process from the printing process and requires different conditions for printing and curing, which improves the print head reliability by keeping nozzles open. The present ink composition provides advantages that after drying and curing, it is mechanically resistant and water and solvent resistant; while at the same time even when the ink is left uncapped and dries at the nozzles, it can be cleaned easily by re-dispersing it in water.

The present ink composition contains a high molecular weight polyurethane polymer that is dispersed in water. When the dispersion is diluted further with water, the interactions between the dispersed polymers (micelles) are lowered, leading to an inherently low viscosity even though the polymer is of a high molecular weight. This is advantageous to the formulator because it enables them to use larger molecules to achieve a cured formulation that is both mechanically and solvent resistant while maintaining flexibility The present invention is directed to an aqueous radiation curable ink composition. The composition comprises (a) an aqueous dispersion comprising anionic acrylated polyurethane and non-volatile cations; (b) at least one non-ionic or anionic surfactant; (c) at least one humectant selected from the group consisting of: polyol, polyether, polyether polyols, polyether alcohol, urea, and amide; and (d) water; wherein the ink composition does not contain a water-soluble or water-miscible (meth)acrylate monomer. De-ionized water is preferred for preparing the ink composition. The ink composition is water-resistant after curing by actinic radiation or by high energy electron beam. However, before curing by radiation, the ink composition is redispersible in water. Actinic radiation, as used herein, refers to electromagnetic radiation that can induce a photochemical reaction; e.g. radiation by UV light from an arc lamp or an LED source. Specific wavelengths utilized for curing in general range from 200 to 450 nm.

The radiation curable aqueous anionic polyurethane dispersion of component (a) is prepared by dispersing polyurethane polymers having anionic acrylate functional groups in water in the presence of a neutralizing agent. As a background, most radiation curable polyurethane dispersions (RC-PUD) are targeted for wood flooring or cabinetry in which they are expected to form a hard and tack-free coating after the drying process. To achieve this, RC-PUD are neutralized using a volatile tertiary amine so that when during the drying phase of the coating process, the volatile amine evaporates and releases into the environment, which leaves the RC-PUD incapable of re-dispersing or re-dissolving in a water-based ink. While this may be tolerable for other applications outside of ink-jet, this fault of RC-PUD neutralized with volatile amines negatively impacts print head reliability and then affects image quality and ultimately print head life. The present invention use non-volatile cations as a neutralizing agent, which allows RC-PUD to re-disperse or re-dissolve in the ink composition and thus enable print head reliability.

Non-volatile cations are used as a neutralizing agent in the present polyurethane dispersion. Non-volatile cations useful for the present invention include monovalent cations such as Na$^+$ and K$^+$. Bivalent and polyvalent cations often destabilize the dispersion.

The aqueous radiation curable ink may include one or more radiation curable polyurethane dispersions to obtain acceptable properties of the radiation cured films. Polyurethane dispersions range between 30 wt % to 60 wt % in non-volatile content. Polyurethane polymers included in the aqueous curable ink are in amounts between 5 wt % and 25 wt % by total weight of the ink composition. Preferably they are between 10 wt % and 20 wt % by total weight of the ink composition.

The aqueous radiation curable ink may include one more surfactants (Component (b)) to modulate the properties of the bulk ink and the radiation cured film. The surfactant(s) may be nonionic or anionic. The useful surfactants include, but are not limited to polyethers, polyether alcohols, polysiloxanes, glycol ethers, acetylinic diols, and fluorocarbons with greater than five linear carbons. Surfactants preferably used in the aqueous curable ink are 0.1 to 5 wt % of the total weight of the ink composition.

Examples of surfactants that may be employed are, but not limited to, BYK-331, BYK-332, BYK-333, BYK-345, BYK-346, BYK-347, BYK-348, BYK 349, BYK 3455, BYK-UV 3530, BYK-DYNWET 800, Dynol 607, Dynol 800, Dynol 810, Dynol 960, Dynol 980, Surfynol 104, Surfynol 420, Surfynol 440, Surfynol 465, Surfynol 485, Surfynol 2502, CHEMGUARD S-550-100, CHEMGUARD S-554-100, CHEMGUARD S-559-100, Dow Corning 57, Dow Corning 67, Dow Corning 500W, Dow Corning 501W, Dow Corning 502W, Capstone FS-31, Captsonte FS-65, Surfadol 465, Dapro W-77, TEGO Twin 4100, TEGO Wet 270, TEGO Wet 510, TEGO Wet 505.

The aqueous radiation curable ink includes one or more humectants (Component (c)). The humectant provides an increase in decap time ("latency") and open time within the print head nozzles, which increases print head reliability. As a background, aqueous inks that print on absorbent substrates typically incorporate a single humectant or a combination of humectants in levels greater than 10 wt %. This practice cannot be adopted for radiation curable inks printed on non-absorbent substrates such as oriented polypropylene, polycarbonate, PET, PVC, and the like, because the ink will not be water resistant after being cured. The present aqueous radiation curable ink composition selects proper kinds of humectants and selects proper amounts of humectants such that the bulk ink has an acceptable open time within the print head nozzles without negatively affecting the properties of the radiation cured films.

Humectants that may be employed in the present invention include, but are not limited to, polyols, polyethers, polyether polyols, polyether alcohol, ureas, and amides. Specific examples of humectants include, but not limited to, propylene glycol, glycerol, 1,5-hexandiol, 1,5-pentandiol, Neopentyl glycol, glucose, PEG400, PEG600, PEG1000, PPG425, ethylene glycol monobutyl ether, propylene glycol n-propyl ether, 1-(2-hydroxyethyl)-2-imidazolidinone, urea, 1,1-dimethyl urea, 1,3-diethyl urea, and 2-pyrrolidone.

Humectants used in the aqueous curable ink of the present invention are in general less than 10 wt % and preferably less than 5 wt % by total weight of the ink composition. For example, the humectants are about 0.5 to 4.5 wt % of the total weight of the ink composition. High amounts (>10 wt %) of humectants may results in poor water resistance after being exposed to actinic radiation or Ebeam. Preferred humectants have molecular weights less than 20,000 Daltons, for example, 50 to 1,000 Dalton.

The aqueous radiation ink composition is curable by electron beam or actinic radiation and the ink composition is water-resistant after curing. However, before curing, the ink composition is redispersible in water even after drying. Thus, if the ink composition dries on ink jet print heads, it can be re-dispersed in water and cleaned to prevent blockage of nozzles.

The aqueous radiation curable ink composition of the present invention may further comprise a photoinitiator, and the ink composition is curable by actinic radiation. Photoinitiators are chosen to absorb specific wavelengths used in the curing process. Photoinitiators may include water soluble, water dispersed and water insoluble photoinitiators. When water-insoluble photoinitiators are used, they are transported into the ink composition using co-solvents. Photoinitiators useful for the present ink composition include one or more α-hydroxyketones, acyl phosphine oxides, and their derivatives. In the present ink composition, photoinitiators are in general used in amounts less than 10 wt %, and preferably less than 5 wt % by total weight of the ink composition. For example, 1 to 5 wt % of photoinitiators are included in the ink composition.

The ink composition of the present invention may further comprise one or more polymers to modulate the properties of the radiation cured film. The polymer is either insoluble in water or has low solubility in water (<10 wt %, preferably <5 wt %, <2 wt %, or <1 wt %) at 25° C.), The polymers comprises a plurality of repeating chemical units. In general, polymers useful for the present ink composition have at least three repeating units, or have a molecular weight of 500-50,000 Daltons. The polymer may be liner, branched, or dendridic. The polymer can be a homopolymer or a heteropolymer comprising acrylic, ether, ester, urethane, or amide moieties in the backbone selected from the group consisting of saturated acyclic aliphatic, saturated cyclic aliphatic, saturated heterocyclic aliphatic, heterocyclic aromatic, aromatic, and a combination thereof.

The polymers may be nonionic or anionic, and they are hydrolytically stable in the presence of water. Preferred polymers are non-water soluble and hydrophobic in nature. The polymers used in this invention do not negatively impact the water resistance of the cured film formed by the ink. Polymers useful for this invention include, but not limited to, polyols, polyethers, polyol polyethers, polyvinylpyrrolidones, polycarboxylates, and polysulfonates. The polymers listed above along with variations and related materials can be obtained from Ashland, Arkema, BASF, and Eastman Chemical. Preferred polymers have a density of less than 1.2 g/mL.

The polymers may optionally contain at least one radiation curable functional group, such as an unsaturated ethylenic (—CH=CH—) functional group. For example, water insoluble acrylated polymers can be added in the present ink composition.

Some examples of polymers include CN160, CN704, CN293, CN549, CN146, CN9101, CN9102, CN9001, CN9028, CN9011, CN551, CN992, CN111US, CN102E, CN110, CN975, CN309, CN9014, SR494LM, CN131B, CN131, CN132, CN152, CN3100, CN133, CN116, CN2203, CN2283, CN2273, CN2304, CN990, CN929, CN972, CN2921, CN9018, and CN971J75.

The amount of polymer(s) present is in general less than 20 wt % by total weight of the ink composition, for example 0.01 to 15 wt % or 1-10 wt %

Many commonly used water-soluble or water miscible radiation curable monomers, e.g., (meth)acrylate monomers, are becoming an increased environmental, health, and safety concern, while radiation curable polymers remain acceptable to employ in such formulations. The use of polymers are favored over monomers due to the risk of monomer migration from cured films into surrounding materials such as food packaging. Inkjet inks require stable viscosity and a long shelf life of over a year. Water-soluble (meth)acrylated-monomers, dimers, and polymers, in an aqueous radiation curable ink composition are particularly not desired because of their hydrolysis in water over time, which reduces pH, changes viscosity, and destabilizes the formulation, and thus reducing the shelf life of the ink composition. On the other hand, water insoluble (meth)acrylate monomers/polymers can be carried into the oleophilic part of the ink composition where they are largely protected from water and can retain stability, and thus they can be used in the present ink composition. As used herewith, (meth)acrylated refers to methacrylated and/or acrylated. (Meth)acrylated monomers/polymers refer to any monomers/polymers having (meth) acrylate functional group.

The ink composition may include one or more colorants to provide colors. Colorants used include pigments that can be self-dispersed, surfactant dispersed, or polymerically dispersed. The pigment dispersions must be redispersible or re-soluble in water. Examples of pigment dispersions include, but not limited to, those manufactured by Cabot Corporation, Clariant, Diamond Dispersions, Emerald Performance Materials, Kodak Specialty Chemicals, and RJA Dispersions.

The aqueous radiation curable ink composition may include one or more co-solvents other than water to modulate the properties of the radiation cured film. Co-solvent should be hydrolytically stable. Co-solvents may function as diluents or transport water insoluble components (such as photoinitiators) into the hydrophobic portion of the ink. Co-solvent may also be used to solubilize polymers that have low solubility in water. Co-solvents may contain at least one radiation curable functional group. Examples of co-solvents include alcohols, esters, ethers, amides, and ketones, in combination with moieties selected from the group consisting of: saturated acyclic aliphatic, saturated cyclic aliphatic, saturated heterocyclic aliphatic, heterocyclic aromatic, aromatic, and a combination thereof. The amount of co-solvent(s) in the present ink composition in general is less than 20 wt %, and preferably less than 20 wt % by total weight of the ink composition; for example, the co-solvent is 1 to 15 wt % or 1 to 10 wt %.

Specific examples of co-solvents are, but not limited to, diacetone alcohol, 2,6,8-trimethyl-4-nonanone, 2,6-dimethyl-4-heptanol, 2-ethylhexanol, ethylene glycol phenyl ether, propylene glycol mono methyl ether, dipropylene glycol mono methyl ether, tripropylene glycol mono methyl ether, propylene glycol mono propyl ether, dipropylenene glycol mono propyl ether, propylene glycol mono n-butyl ether, dipropylene glycol mono n-butyl ether, propylene glycol phenyl ether, dipropylene glycol dimethyl ether, ethylene glycol mono butyl ether, and 2,2,4-trimethyl-1,3-pentanediol 1-isobutyrate.

Depending on the printer head, the present ink composition can be prepared to have a desired viscosity is 4-6 cP, 5-8 cP, or 10-12 cP. In one embodiment, the ink composition may optionally further comprise viscosity modifiers to increase the viscosity of the ink composition to 8-12 cP.

The ink composition may optionally further comprise additives such as leveling agents and bactericides.

The present invention further provides a method for printing a media substrate using the aqueous radiation curable ink composition. The method comprises the steps of: (a) printing a stream of droplets of the aqueous radiation curable ink composition onto a substrate, (b) drying the ink composition printed on the media substrate, and (c) curing the dried ink composition on the substrate by actinic radiation or electron beam. After the printing step (a) and before the drying step (b), the method does not have a step of UV pinning of the printed ink to prevent the ink from moving. Such UV pinning step would affect the water, solvent and mechanical resistance of the resultant image. The printed ink is dried on the substrate, e.g., by evaporation, before the curing step.

Due to the re-dispensability nature of the present ink composition, if an ink residue is formed on a print head, the ink can be re-dispersed by a continuous stream of droplets of the radiation curable ink composition.

The present aqueous radiation curable ink composition can be printed on a wide selection of flexible or rigid substrates and has a good adhesion on the substrates. Suitable substrates include untreated plastics and porous substrates such as paper, cardboard, foam board and textile. The aqueous radiation curable ink composition has a good viscosity for printing performance and is suitable for inkjet application.

In the uncured state, the ink composition has a low viscosity and is readily jetted using inkjet printers. After drying and curing, a dry ink film forms on the substrate that is resistant to water.

The water-redispersible nature of the aqueous curable ink composition can be observed by drawing down or printing the ink on a substrate, and dying the ink, for example under forced air at an elevated temperature. When immersed in water or an aqueous solution, the ink film appears redispersed.

After drying, the ink is exposed to electron beam or UV radiation having a wavelength that matches the adsorption spectrum of the photoinitiator in the ink composition. After curing, the ink film is stable when immersing in water and is not removed from the substrate.

EXAMPLES

Table 1 lists the materials used in the Examples 1-6.

TABLE 1

| Materials | Material Description | Supplier |
| --- | --- | --- |
| Laromer ® UA 9122 | Acrylated polyurethane dispersion, anionic, with a non-volatile cation | BASF |
| MIRAMER WB2210 | Acrylated polyurethane dispersion, anionic, with a non-volatile cation | Miwon Specialty Chemical Co., Ltd. |
| UCECOAT ® 7674 | Acrylated polyurethane dispersion, anionic, with a non-volatile cation | Allnex |
| AlberdingkUSA ® LUX 260 | Acrylated polyurethane dispersion, anionic, with a volatile cation | Alberdingk Boley |
| AlberdingkUSA ® LUX 399 | Acrylated polyurethane dispersion, anionic, with a volatile cation | Alberdingk Boley |
| NeoRad ™ R-441 | Acrylated polyurethane dispersion, nonionic | DSM |
| CN309 | Acrylated polymer | Sartomer |
| TPO-L (2,4,6-trimethylbenzoyl-phenylphosphinate) | Photoinitiator | BASF |
| BYK ® 348 | Silicone surfactant | BYK |
| Cab-o-jet ® 450C | Aqueous pigment dispersion | Cabot |
| PnB (Propylene Glycol n-Butyl Ether) | Co-solvent | LyondellBasell |
| Glycerol | Humectant | Aldrich |

Example 1

An ink composition was prepared by mixing Laromer® UA 9122, TPO-L, CN309, PnB, BYK 348, Cab-o-jet®

450C, glycerol, and deionized water. The resulting mixture was stirred until it was uniformly dispersed.

Example 2

An ink composition was prepared by mixing MIRAMER WB2210, TPO-L, CN309, PnB, BYK 348, Cab-o-jet® 450C, glycerol, and deionized water. The resulting mixture was stirred until it was uniformly dispersed.

Example 3

An ink composition was prepared by mixing UCE-COAT® 7674, TPO-L, CN309, PnB, BYK 348, Cab-o-jet® 450C, glycerol, and deionized water. The resulting mixture was stirred until it was uniformly dispersed.

Example 4. (Comparative)

An ink composition was prepared by mixing AlberdingkUSA® LUX 260, TPO-L, CN309, PnB, BYK 348, Cab-o-jet® 450C, glycerol, and deionized water. The resulting mixture was stirred until it was uniformly dispersed.

Example 5. (Comparative)

An ink composition was prepared by mixing AlberdingkUSA® LUX 399, TPO-L, CN309, PnB, BYK 348, Cab-o-jet® 450C, glycerol, and deionized water. The resulting mixture was stirred until it was uniformly dispersed.

Example 6. (Comparative)

An ink composition was prepared by mixing NeoRad™ R-441, TPO-L, CN309, PnB, BYK 348, Cab-o-jet® 450C, glycerol, and deionized water. The resulting mixture was stirred until it was uniformly dispersed.

Table 2 summarizes the ink compositions prepared in the examples 1-6.

of 75 feet per minute passing under the IR dryer and then the drying tunnel. The film samples were then submerged into a bath of deionized water for 1 min, and then dipped 5 times before their removal from the bath completely. The films were then cured under a LED lamp (8 Watt, 395 nm, 2 passes) in which the portion of the film submerged in the water bath and the portion that was not submerged in the water bath were measured with an Xrite densitometer and inspected visually. The densitometer measures the optical density of the ink film. The optical density for a given ink, over a given substrate, is proportional to the thickness of the film. The redispersible films show low density values. The results are shown in Table 3 with the test images rated accordingly: 1=not redispersible, 2=slightly redispersible, 3=moderately redispersible, 4=mostly redispersible, 5=very redispersible.

TABLE 3

| Ink Formulations | Cyan Density of Non-Water dipped film | Cyan Density of Water dipped film | Redispersibility |
| --- | --- | --- | --- |
| Ex. 1 | 1.894 | 0.149 | 5 |
| Ex. 2 | 2.363 | 0.093 | 5 |
| Ex. 3 | 2.258 | 0.098 | 5 |
| Ex. 4 (comparative) | 2.034 | 1.66 | 1 |
| Ex. 5 (comparative) | 2.067 | 1.834 | 1 |
| Ex. 6 (comparative) | 2.078 | 1.344 | 2 |

Illustrations of the redispersibility of the ink compositions of Examples 1, 2, and 3, and Comparative Examples 4, 5, and 6 are shown in FIG. 1.

The results in Table 3 and the illustrations in FIG. 1 show that acrylated anionic polyurethane dispersions that contain a non-volatile cation are redispersible in deionized water as those that are included in Examples 1, 2, and 3. For Comparative Examples 4 and 5, that includes acrylated anionic polyurethane dispersions that contain a volatile cation, are shown not to be redispersible in deionized water.

TABLE 2

| | % Solids in Material | Ex 1 | Ex 2 | Ex 3 | Ex 4 (comparative) | Ex 5 (comparative) | Ex 6 (comparative) |
| --- | --- | --- | --- | --- | --- | --- | --- |
| Laromer ® UA 9122 | 38% | 52.58% | — | — | — | — | — |
| MIRAMER WB2210 | 40% | — | 50.01% | — | — | — | — |
| UCECOAT ® 7674 | 39% | — | — | 51.18% | — | — | — |
| AlberdingkUSA ® LUX 260 | 40% | — | — | — | 49.64% | — | — |
| AlberdingkUSA ® LUX 399 | 45% | — | — | — | — | 49.88% | — |
| NeoRad ™ R-441 | 38% | — | — | — | — | — | 52.59% |
| Cab-o-jet 450C | 15% | 23.27% | 23.26% | 23.28% | 23.14% | 23.27% | 23.31% |
| CN309 | 100% | 5.01% | 5.01% | 5.06% | 5.20% | 5.00% | 5.01% |
| PnB | 100% | 5.01% | 5.01% | 5.06% | 5.2% | 5.00% | 5.01% |
| Glycerol | 100% | 3.09% | 3.02% | 3.03% | 2.99% | 2.99% | 3.06% |
| TPO-L | 100% | 2.00% | 2.01% | 2.03% | 2.08% | 2.00% | 2.01% |
| BYK ® 348 | 100% | 1.00% | 1.00% | 1.00% | 0.99% | 1.00% | 1.00% |

Evaluation of Redispersibility—Water Dip Test

The formulations of Examples 1, 2, and 3 and Comparative Examples 4, 5, and 6 were applied on Controltac using a #5 Meyer rod. The samples of substrate with the resultant wet films were then placed on a carriage that is fixed to a conveyer. The carriage transported the samples at 75 feet per minute to a stationary position beneath a drying tunnel (Oxytech Systems) in which it sat for one minute where the temperatures range between 55-65° C. The resultant dried films were then immediately passed underneath an IR dryer (Oxytech Systems) at a speed of 75 feet per minute. The film samples were carried back to the starting position at a speed In addition, the result of Comparative Example 6 demonstrates that acrylated non-ionic polyurethane dispersions are not completely redispersible in deionized water.

It is to be understood that the foregoing describes preferred embodiments of the present invention and that modifications may be made therein without departing from the scope of the present invention as set forth in the claims.

What is claimed is:

1. An aqueous radiation curable ink composition, comprising:
  (a) an aqueous dispersion comprising anionic acrylated polyurethane and non-volatile cations;

(b) at least one non-ionic or anionic surfactant;
(c) at least one humectant selected from the group consisting of: polyol, polyether, polyether alcohol, polyether polyols, urea, and amide; and
(d) water;
wherein the ink composition does not contain a water-soluble or water-miscible (meth)acrylate monomer.

2. The ink composition according to claim 1, wherein the ink composition is redispersible in water after drying and before curing, and the ink composition is water-resistant after curing by electron beam or actinic radiation.

3. The ink composition according to claim 1, wherein the non-volatile cations are monovalent metal ions.

4. The ink composition according to claim 1, wherein the surfactant is selected from the group consisting of: polyethers, polyether alcohols, polysiloxanes, glycol ethers, acetylinic diols, and fluorocarbons with greater than five linear carbons.

5. The ink composition according to claim 1, further comprising a photoinitiator, and the ink composition is curable by actinic radiation.

6. The ink composition according to claim 5, wherein the photoinitiator is α-hydroxyketone, acyl phosphine oxides, or derivatives thereof.

7. The ink composition according to claim 1, further comprising one or more polymers having a molecular weight between 500-50,000 Dalton and being soluble in water at less than 10 wt % at ambient temperature.

8. The ink composition according to claim 7, wherein the polymer is a homopolymer or heteropolymer comprising acrylic, ether, ester, urethane, or amide moieties in the backbone selected from the group consisting of saturated acyclic aliphatic, saturated cyclic aliphatic, saturated heterocyclic aliphatic, heterocyclic aromatic, aromatic, and a combination thereof.

9. The ink composition according to claim 7, wherein the polymer comprises at least one radiation curable functional group.

10. The ink composition according to claim 9, wherein the radiation curable functional group is unsaturated ethylenic (—CH=CH—) functional group.

11. The ink composition according to claim 9, wherein the radiation curable functional group is acrylate functional group.

12. The ink composition according to claim 1, further comprising pigment particles.

13. The ink composition according to claim 1, which does not comprise a volatile amine or a volatile ammonium ion.

14. The ink composition of claim 1, wherein the anionic acrylated polyurethane is in an amount of 5-25% by weight of the ink composition, and the non-volatile cations are to neutralize the aqueous dispersion.

15. The ink composition of claim 1, wherein the surfactant is in an amount of 0.1-5% by weight of the ink composition.

16. The ink composition of claim 1, wherein the humectant is in an amount of 0.1-4.5% by weight of the ink composition.

17. The ink composition according to claim 3, wherein the monovalent metal ions are $Na^+$ or $K^+$.

* * * * *